United States Patent
Buttimer (10) Patent No.: US 10,710,401 B2
(45) Date of Patent: Jul. 14, 2020

(54) WHEEL APPARATUS FOR USE WITH VEHICLES

(71) Applicant: Ford Global Technologies, LLC, Dearborn, MI (US)

(72) Inventor: Ryan Buttimer, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 138 days.

(21) Appl. No.: 15/835,011

(22) Filed: Dec. 7, 2017

(65) Prior Publication Data

US 2019/0176515 A1 Jun. 13, 2019

(51) Int. Cl.
| | | |
|---|---|---|
| *B60B 21/02* | (2006.01) | |
| *B60B 3/00* | (2006.01) | |
| *B60B 21/10* | (2006.01) | |
| *B60B 21/12* | (2006.01) | |
| *B60B 17/00* | (2006.01) | |
| *B60C 19/00* | (2006.01) | |

(52) U.S. Cl.
CPC ............ *B60B 21/026* (2013.01); *B60B 3/005* (2013.01); *B60B 21/102* (2013.01); *B60B 21/12* (2013.01); *B60B 17/0017* (2013.01); *B60B 2320/10* (2013.01); *B60B 2340/52* (2013.01); *B60C 19/002* (2013.01)

(58) Field of Classification Search
CPC ..... B60B 21/12; B60B 21/023; B60B 21/026; B60B 3/005
See application file for complete search history.

(56) References Cited

U.S. PATENT DOCUMENTS

| | | | |
|---|---|---|---|
| 5,128,085 A | 7/1992 | Post et al. | |
| 5,415,464 A | 5/1995 | Scott | |
| 6,158,820 A | 12/2000 | Archibald et al. | |
| 6,357,833 B1* | 3/2002 | Bajer | B60B 3/02 152/381.6 |
| 7,487,811 B2* | 2/2009 | Schelhaas | B60B 1/041 152/381.5 |
| 9,302,537 B2* | 4/2016 | Zhu | B60B 21/00 |
| 9,431,000 B2* | 8/2016 | Kamiyama | G10K 11/172 |
| 2004/0250935 A1* | 12/2004 | Morinaga | B60B 3/02 152/381.5 |
| 2007/0175708 A1 | 8/2007 | Rabussier et al. | |
| 2018/0022151 A1* | 1/2018 | Kamiyama | B60B 21/02 301/95.104 |

FOREIGN PATENT DOCUMENTS

| | | |
|---|---|---|
| JP | 2008120242 | 5/2008 |
| WO | 8505328 | 12/1985 |
| WO | 9847722 | 10/1988 |

* cited by examiner

*Primary Examiner* — Jason R Bellinger
(74) *Attorney, Agent, or Firm* — Ray Coppiellie; Hanley, Flight & Zimmerman, LLC (57) ABSTRACT

Wheel apparatus for use with vehicles are disclosed. An example apparatus includes a wheel for a vehicle. The wheel has a groove disposed on an annular wall adjacent a drop well and extending away from the drop well. The example apparatus also includes a ring positioned in the groove.

15 Claims, 7 Drawing Sheets

WHEEL APPARATUS FOR USE WITH VEHICLES

FIELD OF THE DISCLOSURE

This disclosure relates generally to vehicle wheels and, more particularly, to wheel apparatus for use with vehicles.

BACKGROUND

A vehicle may be implemented with one or more lightweight components to improve vehicle performance, such as fuel economy or efficiency, vehicle handling and/or maneuverability, etc. For example, a known vehicle wheel may be constructed of a lightweight alloy (e.g., an aluminum alloy) to provide a reduced unsprung weight of a vehicle compared to other known wheels (e.g., vehicle wheels composed of steel).

SUMMARY

An apparatus disclosed herein includes a wheel for a vehicle. The wheel has a groove disposed on an annular wall adjacent a drop well and extending away from the drop well. The example apparatus also includes a ring positioned in the groove.

Another apparatus includes a vehicle having a wheel rotatably coupled thereto. The wheel includes an annular groove facing a drop well of the wheel. The apparatus also includes a ring extending through the annular groove.

Another apparatus includes a wheel to rotatably couple to a vehicle. The wheel has an annular groove to receive an annular body. The annular groove defines a lip to retain the annular body.

The figures are not to scale. Wherever possible, the same reference numbers will be used throughout the drawing(s) and accompanying written description to refer to the same or like parts. As used in this patent, stating that any part (e.g., a layer, film, area, or plate) is in any way positioned on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Vehicle performance is typically improved by reducing mass or weight (e.g., sprung weight and/or unsprung weight) of a vehicle, such as weight of the vehicle chassis, one or more wheels, etc. For example, known lightweight wheels may improve vehicle handling and/or maneuverability, vehicle acceleration, fuel economy or efficiency, etc. compared to other heavier known wheels. Often, a known vehicle wheel may include grooves to reduce weight or mass thereof (e.g., reduce unsprung weight of the vehicle), for example, positioned on an annular wall (e.g., a wall in which a hole is located that may be associated with a valve) of the wheel between a drop well and a safety hump. However, such grooves may interfere with mounting a tire on the known wheel (e.g., when the tire is inflated). In particular, a tire bead may slide into the groove(s) and/or otherwise engage an uneven surface formed by the groove(s), thereby causing the tire to improperly mount or preventing the tire from mounting on the known wheel (e.g., preventing the tire bead from moving onto a bead seat of the known wheel).

Further, known vehicle wheels may generate audible noise during normal vehicle use, which is sometimes referred to as road noise. For example, a known wheel may resonate (e.g., ring) at one or more frequencies (e.g., between about 100-800 Hertz) while rotating, which may be undesirable for vehicle occupants (e.g., a driver and/or a passenger) and/or persons (e.g., pedestrians, residents living near a roadway, etc.) that may be near the vehicle. Such noise may depend on one or more of (a) structural properties (e.g., a structural resonance) of the known wheel and/or a tire mounted thereto and/or (b) acoustic properties of a space (e.g., an acoustic resonance) enclosed between the known wheel and the tire.

Wheel apparatus for use with vehicles are disclosed. Examples disclosed herein provide an example wheel having an example groove to reduce weight of the wheel, which improves performance (e.g., improves vehicle fuel economy or efficiency, improves vehicle handling and/or maneuverability, improves vehicle acceleration, etc.) of a vehicle implemented with the wheel, such as a car, a truck, a sport-utility vehicle (SUV), etc. Examples disclosed herein provide an example annular body (e.g., a ring, a tube, etc.) positioned in the groove to facilitate mounting a tire on the example wheel, which prevents the above-noted issues (e.g., improper tire mounting) associated with the above-noted known vehicle wheels. In particular, the disclosed annular body may be constructed of one or more materials (e.g., plastic) lighter relative to a material (e.g., aluminum) of the wheel, thereby maintaining a reduced weight or mass of the wheel while having sufficient strength and/or rigidity to support the tire when the example wheel is assembled with the tire (e.g., when the tire is mounted on the wheel and/or inflated).

In some examples, the annular body includes an example surface (e.g., a smooth or flat surface and/or a continuous surface) extending between a drop well and a safety hump of the example wheel to facilitate mounting the tire on the wheel. In particular, the surface receives and/or engages a portion of the tire (e.g., a tire bead) to guide movement thereof. For example, the tire bead slides against the annular body toward a seating surface (e.g., a bead seat) of the wheel. In some examples, at least a portion (e.g., an inner radial portion) of the surface is curved to facilitate the tire sliding from a surface of the drop well to the annular body.

In some examples, to couple (e.g., permanently couple) the example annular body to the example wheel, the example groove forms a lip to engage the annular body, thereby retaining the annular body in the groove (e.g., without a fastener such as an adhesive). In particular, the lip defines an inner surface facing away from the drop well. In some examples, the lip is flexible and/or moves in a first direction to enable the annular body to pass into the groove and/or a second direction, opposite the first direction, to engage and/or retain the annular body when the annular body is sufficiently positioned in the groove. In some examples, the annular body may be constructed of a malleable material (e.g., one or more plastic materials, one or more foam materials, one or more rubber materials, one or more epoxy materials, etc.). In such examples, the annular body may be pressed and/or compressed into the groove such that a first contour of the annular body is at least partially shaped and/or formed in accordance with a second contour of a surface defined by the groove, for example, such that the entire second contour of the wheel engages at least a portion of the first contour (e.g., a portion positioned in the groove). In this manner, the annular body similarly couples to the wheel via the groove.

Additionally or alternatively, in some examples, the groove and/or an outer surface of the wheel adjacent the groove form a protrusion to receive and/or retain the annular body. For example, the protrusion includes a surface extending toward the groove to engage the annular body when the annular body passes into the groove. Further, in such examples, the protrusion facilitates mounting the tire on the wheel. For example, similar to the curved portion of the annular body, the protrusion includes an angled and/or curved surface to receive the tire bead when the tire bead moves toward the bead seat of the wheel. In such examples, the tire bead engages the angled and/or curved surface, which better enables the tire bead to move from the drop well to the annular body.

Further, some disclosed examples provide at least a channel extending through a central and/or inner portion of the example annular body (e.g., when the annular body is a tube). In some such examples, the annular body includes one or more openings or apertures extending from the channel to a space enclosed by the wheel and the tire (e.g., when the tire is mounted on the wheel) to convey a pressurized fluid (e.g., air) therebetween. Such opening(s) and/or channel(s) absorb sound energy in the space and/or mitigate or dampen the above-noted noise (e.g., road noise) that may be generated by the example wheel (e.g., during normal vehicle use). In this manner, the example the channel(s) and/or the opening(s) is/are sized, positioned on and/or in, and/or distributed along the example annular body to effectively reduce and/or eliminate the noise.

Figure 1:
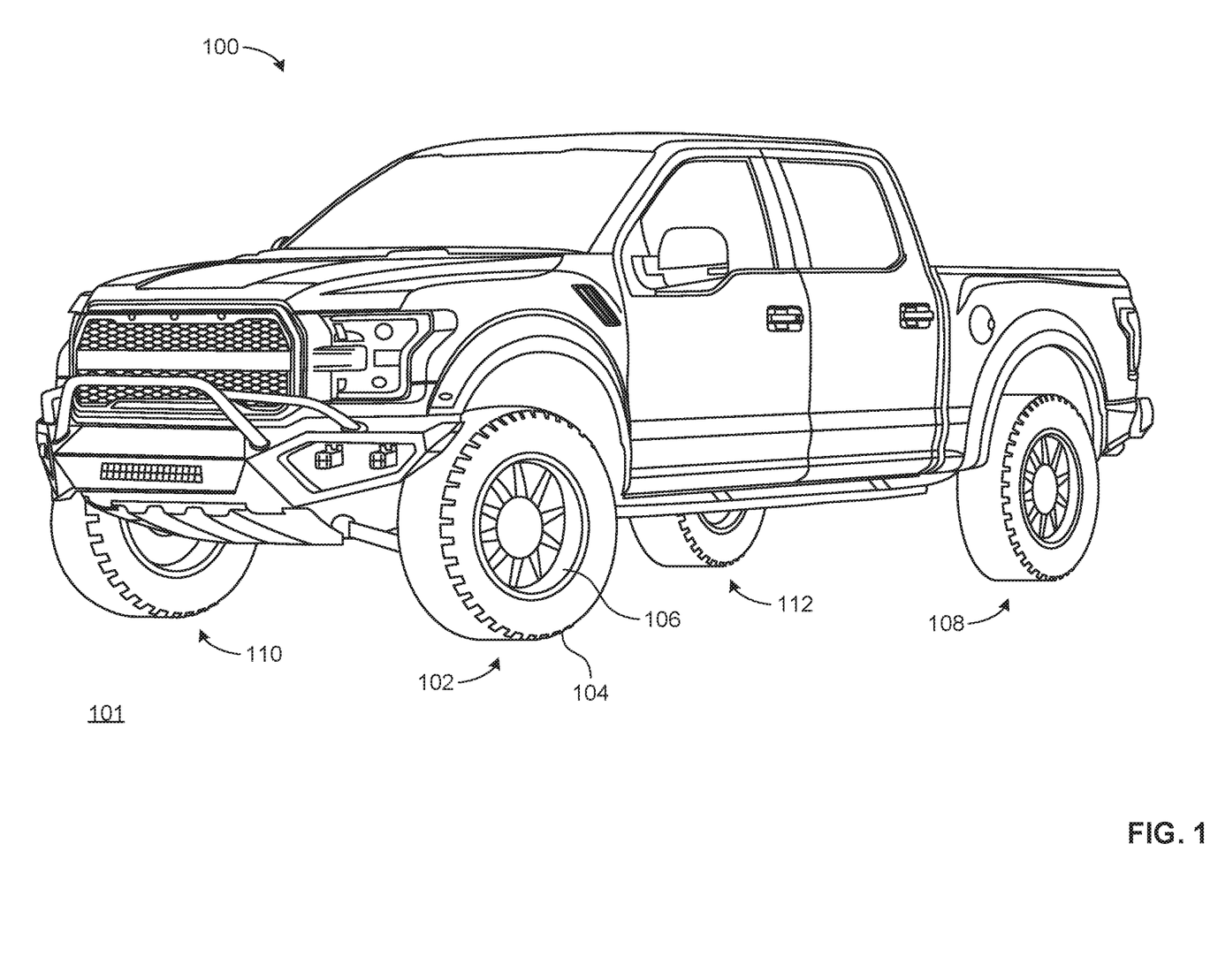
FIG. 1 is an illustration of an example vehicle in which examples disclosed herein may be implemented.

FIG. 1 is a schematic illustration of example vehicle 100 in which examples disclosed herein may be implemented. The vehicle 100 of FIG. 1 may be a car, a truck, an SUV, a van, etc. In particular, the example vehicle 100 includes one or more wheel assemblies rotatably coupled thereto to engage a surface (e.g., asphalt, concrete, dirt, sand, etc.) 101 on which the vehicle 100 is positioned, four of which are shown. For example, as shown in FIG. 1, a first example wheel assembly (e.g., a front and/or left wheel assembly) 102 is rotatably coupled to the vehicle 100 (e.g., via a wheel hub or bearing). The first example wheel assembly 102 of FIG. 1 includes a first tire 104 mounted on and/or coupled to a first wheel 106 (sometimes referred to as a rim). The first wheel 106 of FIG. 1 retains the first tire 104 to provide and/or maintain support to the vehicle 100, for example, when the vehicle 100 is traveling and/or maneuvering on the surface 101. In some examples, prior to vehicle use, the first tire 104 is mounted on and/or dismounted from the first wheel 106 (e.g., when the first wheel assembly 102 is manufactured, serviced, repaired, etc.), which is disclosed in greater detail below in connection with FIG. 2.

The first example wheel 106 of FIG. 1 may be constructed of one or more metals (e.g., one or more alloys) and/or composite materials, such as aluminum, steel, carbon fiber, etc. In particular, a relatively lightweight material (e.g., aluminum and/or carbon fiber) may provide for a reduced weight (e.g., compared to steel) of the first wheel 106 while maintaining strength and/or rigidity to support the vehicle 100 on the first tire 104, which improves performance of the vehicle 100 relative to heavier wheel assemblies.

As shown in FIG. 1, the example vehicle 100 includes a second example wheel assembly (e.g., a back and/or left wheel assembly) 108, a third example wheel assembly (e.g., a front and/or right wheel assembly) 110, and a fourth example wheel assembly (e.g., a back and/or right wheel assembly) 112, each of which may be similar (e.g., substantially the same or identical) or different relative to the first wheel assembly 102. While FIG. 1 depicts the example vehicle 100 having the four example wheel assemblies 102, 108, 110, 112, in other examples, the vehicle 100 includes additional or fewer wheel assemblies. Further, while FIG. 1 depicts aspects in connection with the first example wheel assembly 102, such aspects may likewise apply to one or more of the other wheel assemblies 108, 110, 112 of the example vehicle 100 and/or a fifth wheel assembly 200 (shown in FIG. 2) that may be advantageously used with the vehicle 100, as disclosed in greater detail below in connection with FIG. 2.

Figure 2:
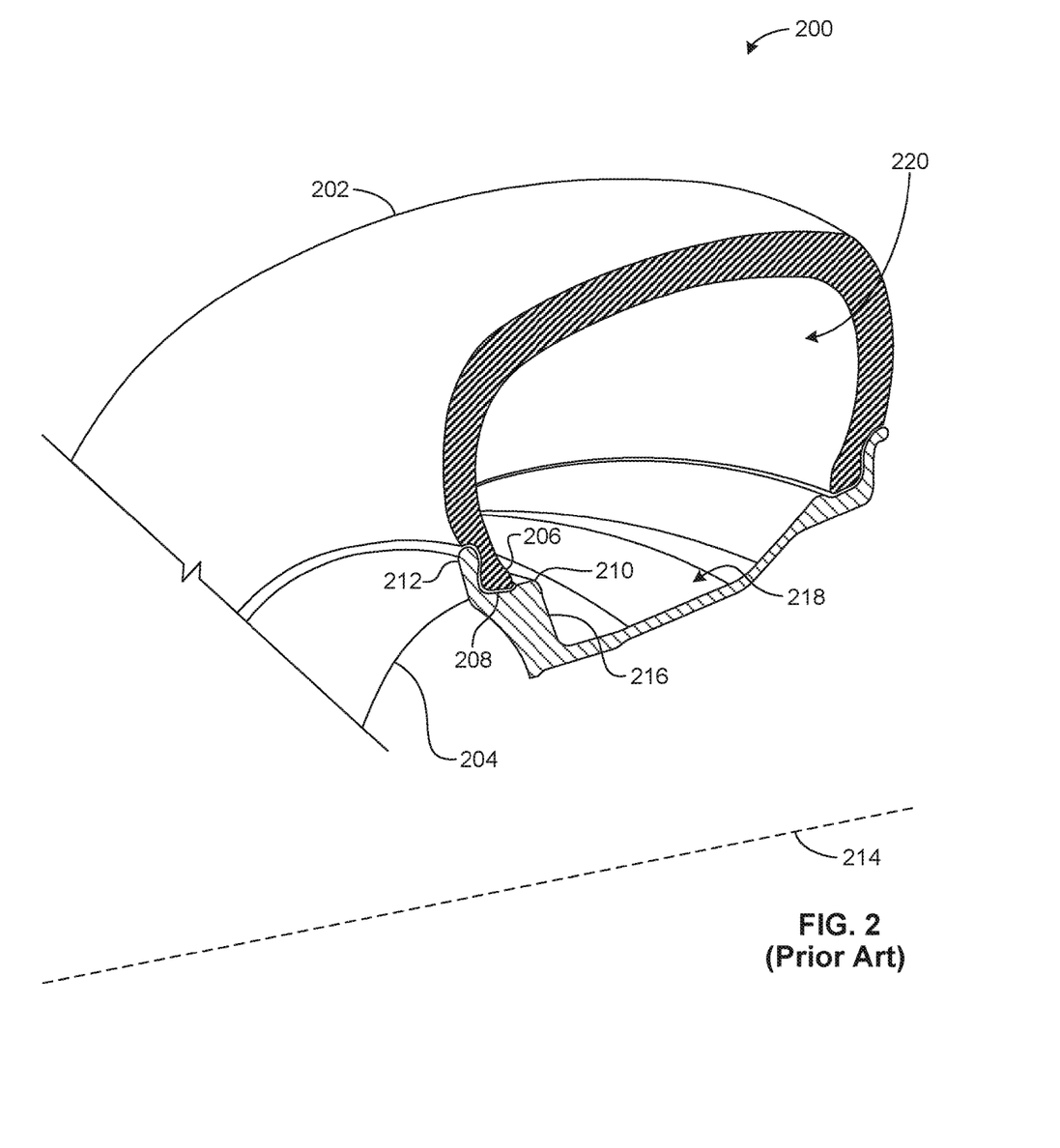
FIG. 2 is a partial cross-sectional view of a prior art wheel assembly.

FIG. 2 is a partial cross-sectional view of the above disclosed fifth example wheel assembly 200 that may be implemented in the example vehicle 100 of FIG. 1 and/or used to implement one or more of the example wheel assemblies 102, 108, 110, 112 of the vehicle 100 to reduce weight of the wheel assemblies 102, 108, 110, 112 and/or the vehicle 100, which improves performance of the vehicle 100 (e.g., improves one or more of vehicle fuel economy or efficiency, vehicle handling and/or maneuverability, vehicle acceleration, etc.). In the example of FIG. 2, the fifth wheel assembly 200 includes a second example tire 202 mounted on and/or coupled to a second example wheel 204. In some examples, the second tire 202 is mounted on and/or removed from the second wheel 204, for example, when the fifth wheel assembly 200 is manufactured, serviced, repaired, etc. In particular, the example second tire 202 of FIG. 2 includes a bead 206 (sometimes referred to as a tire bead) positioned on a seating surface (e.g., a circumferential outer surface) 208 (sometimes referred to as a bead seat) of the second wheel 204, which enables the second wheel 204 to retain at least a portion of the second tire 202 and/or prevents the second tire 202 from dismounting and/or decoupling from the second wheel 204.

In some examples, the seating surface 208 of FIG. 2 is at least partially defined by a first protrusion (e.g., an annular protrusion) 210 (sometimes referred to as a safety hump and/or a bead safety hump) and a first flange 212 (sometimes referred to as an outer flange) of the second wheel 204. In the example of FIG. 2, each of the first protrusion 210 and the first flange 212 extends away from the seating surface 208 in a radially outward direction relative to a rotational axis 214 of the second wheel 204.

In some examples, the second wheel 204 includes a mounting wall (e.g., an annular wall) 216 extending between the first protrusion 210 and a drop well 218, which facilitates mounting the second tire 202 to the second wheel 204 and/or positioning the tire bead 206 on the seating surface 208. In particular, the bead 206 of the second tire 202 slides against at least a portion of the wall 216 when moving from the drop well 218 to the seating surface 208, for example, when the second tire 202 is inflated and/or mounted to the second wheel 204. The wall 216 of FIG. 2 has a thickness (e.g., about 0.5 inches) that may be defined by a wheel mold in which the example wheel 204 is casted and/or formed. In some examples, the wall 216 includes an opening or aperture (e.g., a valve hole) that may be associated with a tire pressure monitoring system (TPMS).

In the example of FIG. 2, an example space 220 is enclosed between and/or defined by the second tire 202 and the second wheel 204 to contain a pressurized fluid (e.g., air), for example, when inflating the second tire 202. In some examples, at least a portion of the second tire 202 and/or the second wheel 204 generate sound or noise in the pressurized fluid, for example, during use of the vehicle 100, which is disclosed in greater detail below in connection with FIGS. 6A-C.

Figure 3:
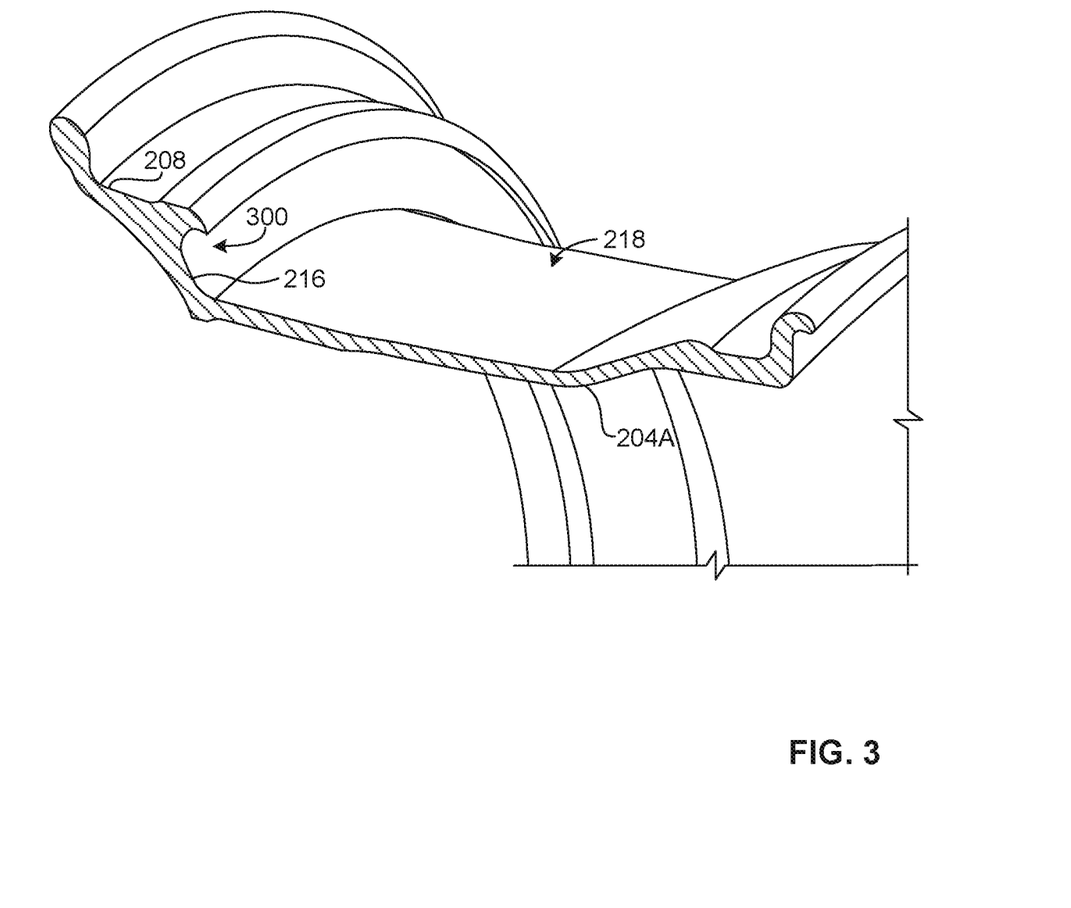
FIG. 3 is a partial cross-sectional view of an example wheel of an example wheel assembly and shows an example groove in accordance with example disclosed herein.

FIG. 3 is a partial cross-sectional view of an example third wheel 204A and shows an example groove (e.g., an annular groove) 300 in accordance with examples disclosed herein. In the example of FIG. 3, the groove 300 is disposed on the wall 216 of the third wheel 204A between the seating surface 208 and the drop well 218. As a result, a mass and/or a weight of the third wheel 204A is reduced (e.g., a rotational inertia of the third wheel 204A is reduced) by implementing the third wheel 204A with the example groove 300, which improves performance of the vehicle 100 (e.g., improves one or more of vehicle fuel economy or efficiency, vehicle handling and/or maneuverability, vehicle acceleration, etc.) by reducing unsprung vehicle weight. In some examples, the groove 300 of FIG. 3 receives and/or retains one or more of a ring, a tube, etc. to facilitate mounting the second tire 202 on the third wheel 204A, which prevents improper tire mounting as well as maintains a reduced weight of the third wheel 204A, as disclosed in greater detail below.

In some examples, the groove 300 of FIG. 3 surrounds the third wheel 204A and/or is continuous. While FIG. 3 depicts the single example groove 300, in other examples, the wall 216 may include one or more additional grooves disposed thereon (e.g., similar or different relative to the example groove 300), for example, distributed radially relative to the rotational axis 214. In such examples, the grooves may be sized and/or spaced such that weight or mass of the third wheel 204A is balanced relative to the rotational axis 214, which improves wheel performance (e.g., when operating at high rotational speeds).

Figure 4:
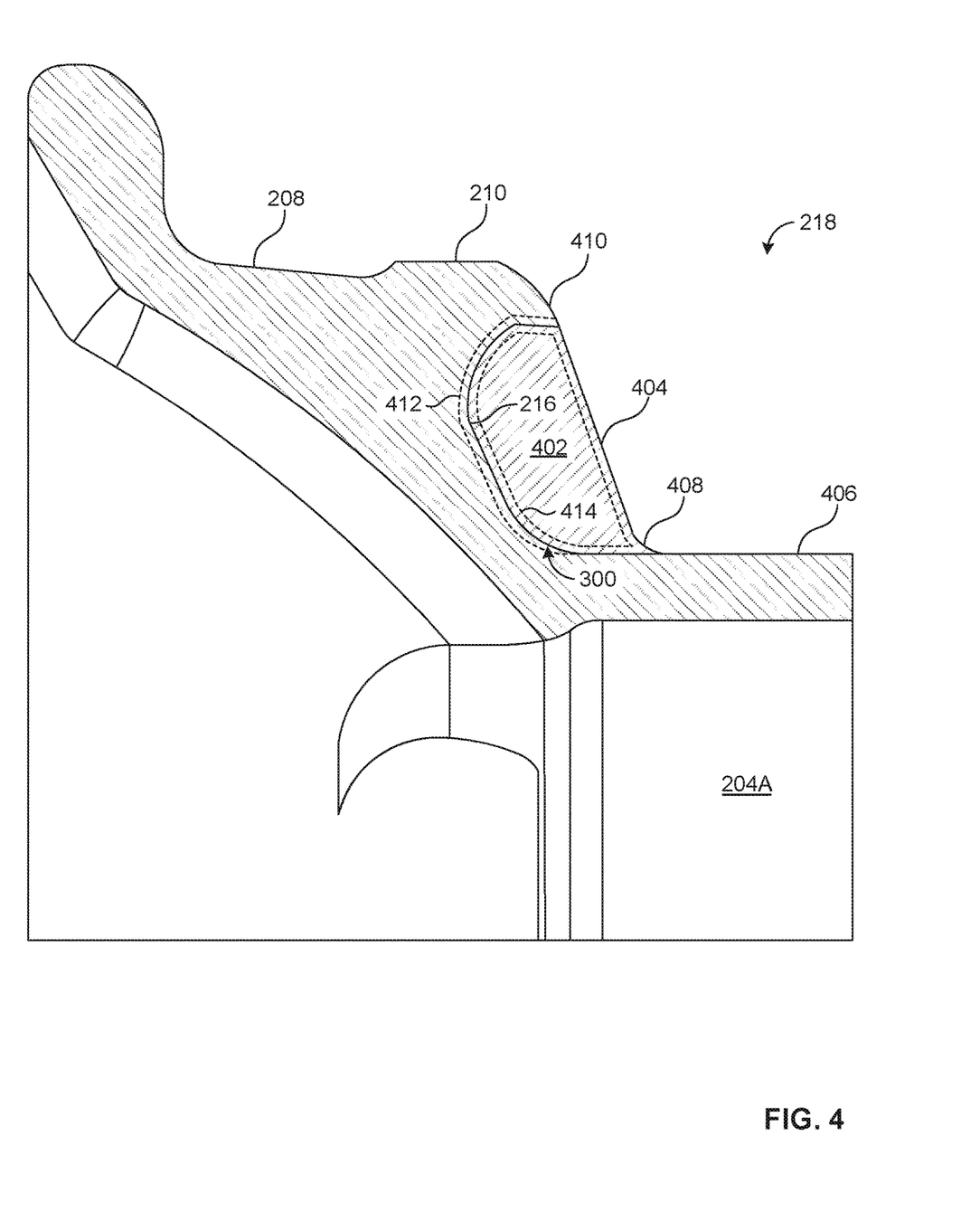
FIGS. 4 and 5 are enlarged cross-sectional views of the example wheel of FIG. 3 and show an example annular body.

FIG. 4 is enlarged cross-sectional view of the third wheel 204A f FIG. 3 and shows an example first annular body 402 positioned in the example groove 300. The first annular body 402 of FIG. 4 facilitates mounting the second tire 202 to the third wheel 204A (e.g., prevents improper tire mounting) as well as maintains a reduced weight of the third wheel 204A provided by the groove 300.

In some examples, the example first annular body 402 includes a mounting surface 404 to receive at least a portion (e.g., the bead 206) of the second example tire 202, for example, when mounting the second tire 202 on the third wheel 204A. The mounting surface 404 of FIG. 4 extends between the bead seat 208 and/or the first protrusion 210 and an outer surface (e.g., a circumferential surface) 406 of the drop well 218. In some examples, as shown in FIG. 4, at least a portion of the mounting surface 404 (e.g., a portion adjacent the first protrusion 210, a central portion of the mounting surface 404, and/or a portion adjacent the outer surface 406 of the drop well 218) of the example first annular body 402 is flat or smooth and/or continuous, which facilitates the second tire 202 sliding thereon. Additionally or alternatively, in some examples, at least a portion of the mounting surface 404 of FIG. 4 is curved. For example, the mounting surface 404 of FIG. 4 includes a curved portion 408 disposed at an inner radius of the first annular body 402 extending to the outer surface 406 of the drop well 218, which may facilitate the tire bead 206 moving and/or sliding from the outer surface 406 of the drop well 218 to the example first annular body 402.

In some examples, the example first annular body 402 of FIG. 4 couples (e.g., permanently couples) to the third wheel 204A via the groove 300. For example, the groove 300 at least partially surrounds the first annular body 402 to retain the first annular body 402 therein. As shown in FIG. 4, the example groove 300 provides a second example protrusion (e.g., an annular protrusion) 410 extending away from wall 216 to receive and/or engage the first annular body 402, which is disclosed in greater detail below in connection with FIG. 5. Additionally or alternatively, in other examples, the first annular body 402 couples to the third wheel 204A via one or more chemical fasteners (e.g., adhesives) and/or mechanical fasteners (e.g., welds, screws, nuts, bolts, clips, etc.).

In some examples, the example first annular body 402 of FIG. 4 includes one or more of a ring, a tube, and/or one or more other suitable structures that may be positioned in the example groove 300. In particular, the example first annular body 402 has sufficient strength and/or rigidity to support the second tire 202 and/or enable the tire bead 206 to move from the drop well 218 to the seating surface 208 (e.g., without interfering with the example groove 300). For example, the example first annular body 402 includes one or more of acrylonitrile butadiene styrene (ABS), polyethylene terephthalate (PET), high-density polyethylene (HDPE), low-density polyethylene (LDPE), polypropylene (PP), polyvinyl chloride (PVC), polycarbonate (PC), and/or polyurethane (PU). In some examples, the first annular body 402 of FIG. 4 is continuous and/or surrounds the third wheel 204A. In other examples, the example first annular body 402 includes one or more portions (e.g., one or more portions of a ring and/or a tube) at least partially positioned in the example groove 300. In particular, the one or more portions may be spaced circumferentially and/or evenly in the groove 300 and/or sized to balance the third wheel 204A.

In some examples, as shown in FIG. 4, the example groove 300 provides a first contour 412 (as represented by the dotted/dashed lines in FIG. 4) shaped to engage a second contour 414 (as represented by the dotted/dashed lines in FIG. 4) of the first annular body 402, which prevents movement of the first annular body 402 in the groove 300 and/or prevents the second tire 202 from improperly mounting to the third wheel 204A. Further, by implementing the third wheel 204A with the first contour 412 substantially the same as at least a portion of the second contour 414 (e.g., a portion positioned in the groove 300), stress (e.g., normal stress, bending stress, shear stress, etc.) imparted on the first annular body 402 by the tire bead 206 (and/or by the third wheel 204A) is reduced and/or effectively dispersed through the first annular body 402, which may prevent the first annular body 402 from cracking, fracturing, deforming (e.g., plastically deforming), and/or otherwise receiving damage.

Further still, in such examples, structural performance of the third wheel 204A is improved by reducing stress (e.g., normal stress, bending stress, shear stress, etc.) imparted on the wall 216 of the third wheel 204A adjacent and/or surrounding the groove 300. For example, stress imparted on a portion of the wall 216 (e.g., an inner radial portion of the wall 216) of the third wheel 204A by the weight of the vehicle 100 is reduced by positioning the first annular body 402 in the groove 300. As shown in FIG. 4, the entire first contour 412 of the third wheel 204A engages at least a portion of the second contour 414 of the first annular body 402 (e.g., a portion of the first annular body 402 positioned in the groove 300).

Figure 5:
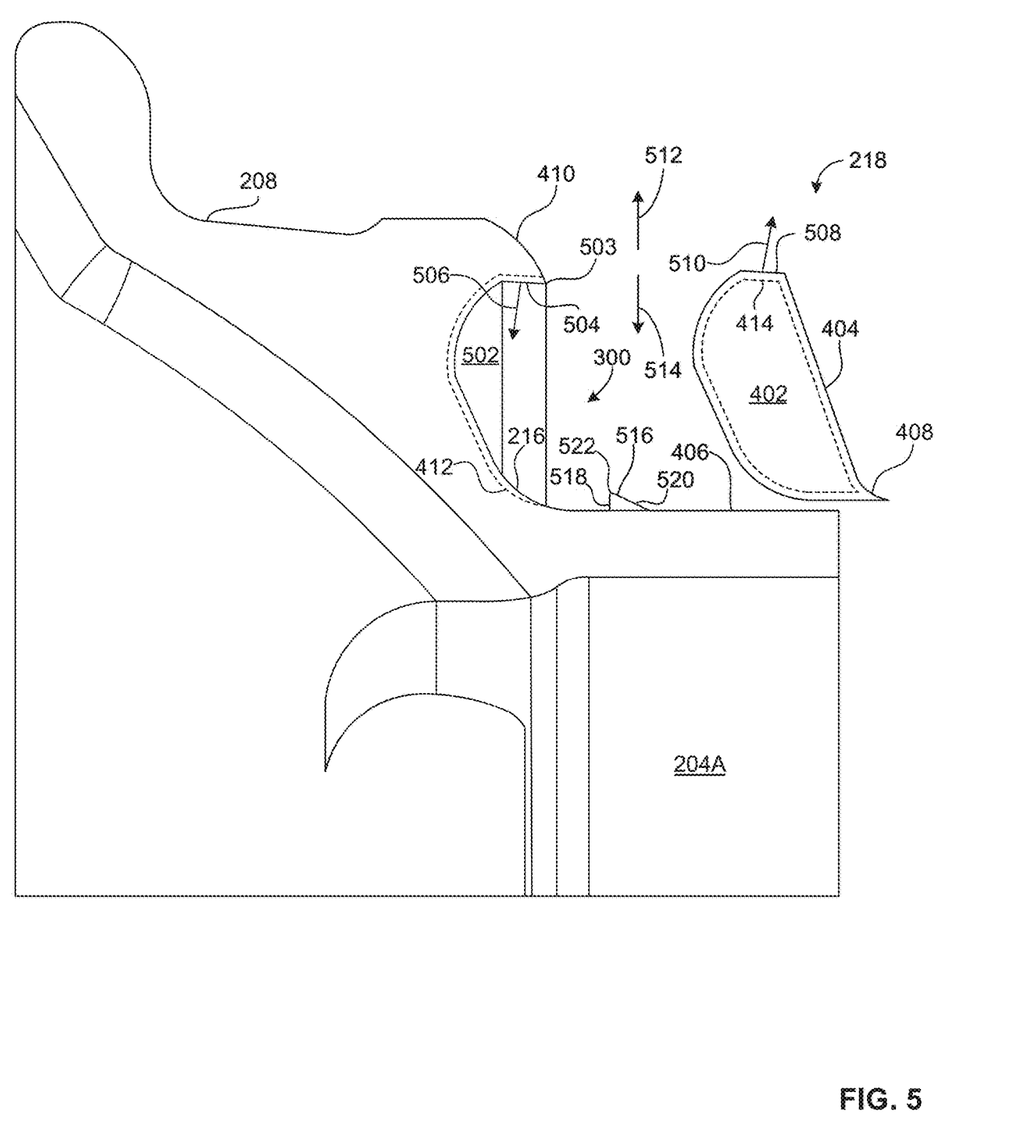

FIG. 5 is a detailed view of the example third wheel 204A of FIG. 4 and shows the example first annular body 402 separated from the example groove 300. As shown in FIG. 5, the example groove 300 forms an inner surface 502 of the third wheel 204A defining the first example contour 412 (as represented by the dotted/dashed lines in FIG. 5), for example, formed by a machine (e.g., a lathe). In particular, the first example contour 412 of FIG. 5 is shaped to engage at least a portion of the first annular body 402 when the first annular body 402 is positioned in the groove 300.

In some examples, the first annular body 402 of FIG. 5 is pre-formed and/or formed prior to being positioned in the example groove 300. For example, the second contour 414 of the first annular body 402 may be molded, machined, etc. (e.g., when the first annular body 402 is manufactured), for example, in accordance with the first contour 412. Additionally or alternatively, in some examples, at least a portion of the second example contour 414 is formed as a result of the first annular body 402 being pressed into the groove 300. For example, in examples where the first annular body 402 includes one or more malleable materials, such as one or more rubber materials (e.g., natural rubber (NR), synthetic rubber, etc.), one or more foam materials (e.g., polyurethane (PU), polystyrene (PS), etc.), etc., the first annular body 402 may be pressed and/or compressed into the groove 300, thereby forming the second contour 414.

As shown in FIG. 5, the second protrusion 410 of the third wheel 204A forms an example lip 503 having a first mating surface (e.g., a flat) 504 to engage the first annular body 402, thereby coupling the first annular body 402 to the third wheel 204A. In particular, the first mating surface 504 faces in a first direction 506 to engage a portion of the first annular body 402 such as, for example, a second mating surface (e.g., a flat) 508 of the first annular body 402. In such examples, the first direction 506 in which the first mating surface 504 faces has a horizontal component. That is, the first mating surface 504 of FIG. 5 at least partially faces toward the left (in the orientation of FIG. 5) and/or away from the drop well 218. Further, the second mating surface 508 of the first annular body 402 of FIG. 5 faces in a second direction 510 (e.g., opposite the first direction 506) when the first annular body 402 is positioned in the groove 300. In particular, the second direction 510 in which the second mating surface 508 faces similarly has a horizontal component opposite relative to the horizontal component of the first mating surface 504. That is, the second mating surface 508 at least partially faces toward the right (in the orientation of FIG. 5) and/or the drop well 218. As shown in FIG. 5, the second example contour 414 of the first annular body 402 defines the second mating surface 508 and/or the mounting surface 404.

In some examples, the lip 503 of FIG. 5 may flex and/or strain in a third direction (e.g., a radially outward direction away from the first annular body 402) 512 to enable the first annular body 402 to initially pass into the groove 300. Further, the example lip 503 flexes and/or strains in a fourth direction 514 (e.g., a radially inward direction toward the first annular body 402), opposite the third direction 512, to engage the second mating surface 508 and retain the first annular body 402 in the groove 300. In such examples, the first annular body 402 supports the lip 503 and/or substantially prevents the lip 503 from further moving when positioned in the groove 300, which may reduce stress of an inner radial portion of the wall 216. In such examples, at least a portion (e.g., a cross-sectional portion) of the first annular body 402 may be sized larger than at least a portion (e.g., a cross-sectional portion) of the groove 300, which facilitates coupling the first annular body 402 to the third wheel 204A in the above disclosed manner. While FIG. 5 depicts each of the groove 300 and the first annular body 402 having a cross-sectional shape that is oblong, in other examples, the groove 300 and/or the first annular body 402 include differently shaped cross-sections, as disclosed in greater detail below in connection with FIGS. 6A-C.

In some examples, the third wheel 204A includes a third example protrusion (e.g., an annular protrusion) 516 disposed on the outer surface 406 of the drop well 218 to retain the first annular body 402 in the groove 300 and/or facilitate mounting the second tire 202 on the third wheel 204A, as shown in FIG. 5. The third protrusion 516 of FIG. 5 is at least partially formed and/or defined by the groove 300, the wall 216 of the third wheel 204A, and/or the outer surface 406 of the drop well 218 adjacent the groove 300. For example, the third protrusion 516 is at least partially formed as a result of the groove 300 being formed in the wall 216 of third wheel 204A (e.g., as a result of machining the third wheel 204A). In some examples, the third protrusion 516 is continuous and/or surrounds the third wheel 204A. While FIG. 5 depicts the single third protrusion 516, in other examples, the outer surface 406 of the drop well 218 includes one or more other protrusions (e.g., similar or different relative to the third protrusion 516), each of which may be sized and/or positioned on the third wheel 204A (e.g., spaced in the groove 300) such that the third wheel 204A is balanced. In such examples where the second wheel 204 includes the third protrusion 516, the first annular body 402 may not include the curved portion 408. Further, in some examples, the third protrusion 516 of FIG. 5 (and/or the one or more other protrusions) at least partially defines the first example contour 412 of the third wheel 204A and/or the second example contour 414 of the first annular body 402.

In some examples, the third protrusion 516 (and/or the one or more other protrusions) includes a first surface 518 to engage at least a portion of the first annular body 402, thereby retaining the first annular body 402 in the groove 300. In the example of FIG. 5, at least a portion of the first surface 518 of the third protrusion 516 forms the second contour 414 of the first annular body 402 and/or faces toward the groove 300 to support the first annular body 402 when positioned in the groove 300. In some examples, the third protrusion 516 of FIG. 5 includes a second surface 520 to engage at least a portion of the second tire 202. For example, the bead 206 of the second tire 202 slides against the second surface 520 of the third protrusion 516 when moving toward the first annular body 402, which facilitates the second tire 202 moving from the surface 406 of the drop well 218 to the surface 404 of the first annular body 402. While FIG. 5 depicts the second surface 520 of the third protrusion 516 to be flat or smooth and/or angled relative to the outer surface 406 of the drop well 218, in other examples, one or more portions of the second surface 520 of the third protrusion 516 may be curved. Further, as shown in FIG. 5, an edge 522 is formed by the first surface 518 and the second surface 520 of the third protrusion 516. In some examples, the edge 522 of FIG. 5 is chamfered.

Figure 6A:
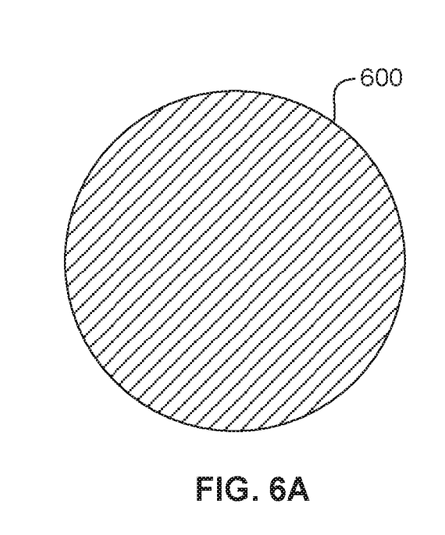
FIGS. 6A-C are cross-sectional views of other example annular bodies in accordance with disclosed examples.
Figure 6B:
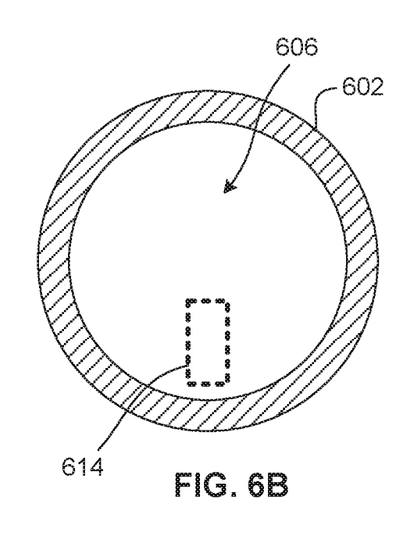
Figure 6C:
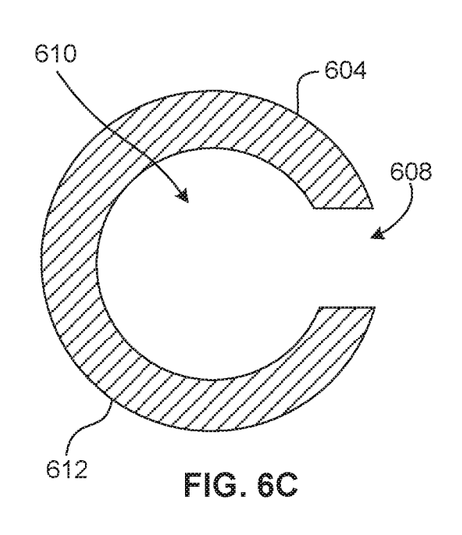

FIGS. 6A-C are cross-sectional views of a second example annular body 600, a third example annular body 602, and a fourth example annular body 604 and show example cross-sectional shapes thereof, each of which may be used to implement at least a portion of the cross-section of the first example annular body 402 of FIGS. 4 and 5. In some examples, similar to the first annular body 402, one or more of the second example annular body 600, the third example annular body 602, and/or the fourth example annular body 604 may be implemented in the third wheel 204A of FIGS. 3-5. As shown in FIG. 6A, the cross-section of the second annular body 600 is circular (e.g., when the second annular body 600 is a ring), for example, before the second annular body is pressed and/or compressed into the example groove 300 of the third wheel 204A. However, in other examples, the second annular body 600 may be shaped differently.

As shown in FIG. 6B, at least a portion of the third annular body 602 is hollow (e.g., when the third annular body 602 is a tube), which facilitates flexibility and/or compression of the third annular body 602. In some such examples, when the third annular body 602 is sized larger than the groove 300 of the third wheel 204A, the third annular body 602 includes a first example channel 606 that may be sized and/or positioned such that the third annular body 602 is both sufficiently flexible and/or compressible to pass into the groove 300 while being sufficiently stiff and/or rigid to remain in the groove 300, as shown in FIG. 6B.

In some examples, the first channel 606 of FIG. 6B is continuous or extends through only a portion of the third annular body 602. In some such examples, the example third annular body 602 includes one or more other example channels (e.g., similar or different relative to the first channel 606), for example, distributed radially relative to a central axis of the third annular body 602 (e.g., relative to the rotational axis 214 of the third wheel 204A). While the example of FIG. 6B depicts the example first channel 606 to have a circular cross-section, in other examples, the first channel 606 may be shaped differently. Further, while the example of FIG. 6B depicts the first channel 606 to be centrally disposed on the cross-section of the third annular body 602, in other examples, the first channel 606 may be positioned differently on the cross-section of the third annular body 602 (e.g., positioned offset relative to the central portion of the cross-section).

As shown in FIG. 6C, the example fourth annular body 604 includes an opening or aperture 608 extending to a second example channel (e.g., similar or different relative to the first example channel 606 of the third annular body 602) 610 of the fourth annular body 604 to convey the above disclosed pressurized fluid (e.g., air) between the second channel 610 and the space 220 enclosed between the second tire 202 and the third wheel 204A, which absorbs and/or mitigates or dampens vibrations and/or oscillations in the pressurized fluid (e.g., generated by the fifth wheel assembly 200). In this manner, the example second channel 610 and/or the opening 608 may be positioned and/or sized to reduce and/or eliminate noise that may be generated by the third wheel 204A and/or the second tire 202 (e.g., during use of the vehicle 100). While FIG. 6C depicts a single opening 608 positioned on an outer surface (e.g., an outer circumferential surface) 612 of the example fourth annular body 604, in other examples, the fourth annular body 604 includes one or more other openings or apertures (e.g., similar or different relative to the example opening 608), for example, distributed radially relative to the central axis of the fourth annular body 604.

In some examples, one or more electronic components (e.g., one or more circuits, one or more sensors, one or more wires or cables, etc.) may be disposed in the second annular body 600, the third annular body 602, and/or the fourth annular body 604. For example, as shown in FIG. 6B, a sensor (e.g., a pressure sensor) 614 is at least partially positioned in the first channel 606 and/or coupled to the third annular body 602, which may be associated with a tire pressure monitoring system (TPMS). For example, the sensor 614 measures and/or determines a fluid pressure within the space 220 defined by the second tire 202 and the third wheel 204A and/or provides the measurement(s) to the TPMS (e.g., via one or more signal wires). In some examples, the sensor 614 is positioned on and/or adjacent the wall 216 of the third wheel 204A (e.g., the sensor 614 is coupled to the third wheel 204A).

Figure 7:
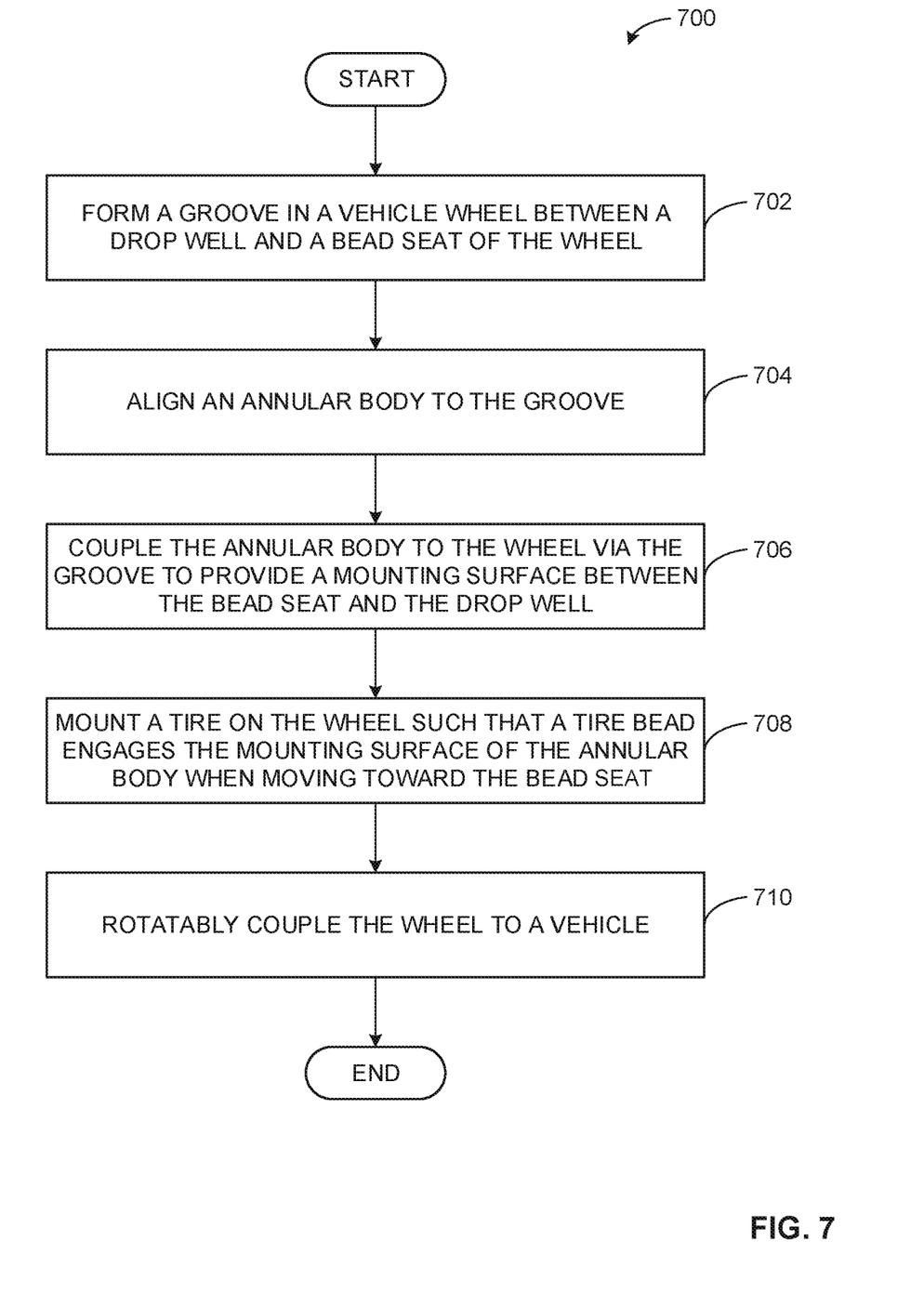
FIG. 7 is a flow diagram of an example method that can be used to implement the example vehicle of FIG. 1, the example wheel assembly of FIG. 2, the example wheel of FIGS. 3-5, the example annular body of FIGS. 4 and 5, and/or the other example annular bodies of FIGS. 6A-C.

FIG. 7 is a flow diagram of an example method 700 that can be used to implement the example vehicle 100 of FIG. 1, one or more of the example wheel assemblies 102, 108, 110, 112 of FIG. 1, the fifth example wheel assembly 200 of FIG. 2, the third wheel 204A of FIGS. 3-5, the first example annular body 402 of FIGS. 4 and 5, the second example annular body 600 of FIG. 6A, the third example annular body 602 of FIG. 6B, and/or the fourth example annular body 604 of FIG. 6C. The example method 700 may be implemented to reduce weight of one or more of the vehicle 100 and/or the wheel assemblies 102, 108, 110, 112, 200, which improves performance of the vehicle 100. The example method 700 begins by forming a groove in a vehicle wheel between a drop well and a bead seat of the wheel (block 702). In some examples, the example groove 300 of FIGS. 3-5 is formed in t the third wheel 204A between the example drop well 218 and the example seating surface 208. In such examples, at least a portion of the wall 216 of the third wheel 204A is removed via a machine, such as a lathe. In other examples, the example groove 300 may be formed via a wheel mold when the third wheel 204A is casted and/or molded (e.g., during wheel manufacture).

The example method 700 also includes aligning an annular body to the groove (block 704). In some examples, the first example annular body 402 of FIGS. 4 and 5 is aligned to the example annular groove 300 of the third wheel 204A. For example, the second example contour 414 of the first annular body 402 is positioned adjacent and/or proximate to the first contour 412 of the inner surface 502 defined by the groove 300. In some examples, the second mating surface 508 of the first annular body 402 is positioned adjacent and/or proximate to the first mating surface 504 of the lip 503 defined by the groove 300.

The example method 700 also includes coupling the annular body to the wheel via the groove to provide a mounting surface between the bead seat and the drop well (block 706). In some examples, the example first annular body 402 of FIGS. 4 and 5 is coupled to the example third wheel 204A via the example groove 300 to provide the example mounting surface 404 positioned between the example seating surface 208 and the example drop well 218. For example, at least a portion (e.g., the first mating surface 504) of the example lip 503 of the third wheel 204A engages at least a portion (e.g., the second mating surface 508) of the first annular body 402, thereby retaining the first annular body 402 in the groove 300. In some such examples, the lip 503 may flex and/or move in the third direction 512 when the first annular body 402 initially passes into the groove 300 and decompress and/or move in the fourth direction 514 when the first annular body 402 is sufficiently positioned in the groove 300. For example, at least a portion (e.g., a cross-sectional portion) of the annular body 402 may be sized larger than at least a portion (e.g., a cross-sectional portion) of the groove 300.

In some examples, to couple the first annular body 402 to the third wheel 204A, the first annular body 402 engages the third protrusion 516 positioned in and/or adjacent the groove 300. In such examples, the first surface 518 of the third protrusion 516 receives at least a portion of the first annular body 402 when the first annular body 402 passes into the groove 300.

In some examples, to couple the first annular body 402 to the third wheel 204A, the first annular body 402 is pressed and/or compressed into the groove 300. In such examples, the annular body includes one or more malleable materials such that the second contour 414 is formed as a result of the inner surface 502 of the third wheel 204A imparting a force on and/or compressing the first annular body 402 when passing into the groove 300. Additionally or alternatively, in some examples, one or more chemical fasteners (e.g., adhesives) is/are disposed on at least a portion of the first annular body 402 and/or the inner surface 502 defined by the groove 300, thereby coupling the first annular body 402 to the third wheel 204A. Similarly, in some examples, one or more mechanical fasteners (e.g., welds, bolts, clips, etc.) may be advantageously used to couple the first annular body 402 to the third wheel 204A via the groove 300.

The example method 700 also includes mounting a tire on the wheel such that a tire bead engages a mounting surface of the annular body when moving toward the bead seat (block 708). In some examples, the example second tire 202 of FIG. 2 is mounted on the example third wheel 204A. In particular, the example bead 206 of the second tire 202 slides against at least a portion of the example surface 404 of the first annular body 402 when moving toward the example seating surface 208 of the third wheel 204A, for example, when the second tire 202 is assembled with the third wheel 204A (e.g., when the second tire 202 is inflated). In some examples, the bead 206 of the second tire 202 slides on and/or engages the curved portion 408 of the first annular body 402, which facilitates the second tire 202 moving from the surface 406 of the drop well 218 to the surface 404 of the first annular body 402. In some examples, the second tire 202 engages and/or slides against at least a portion of the third protrusion 516 of the third wheel 204A. For example, the second surface 520 of the third protrusion 516 receives the tire bead 206 when the tire bead 206 is moving toward the first annular body 402, which similarly facilitates the second tire 202 moving from the surface 406 of the drop well 218 to the surface 404 of the first annular body 402.

The example method 700 also includes rotatably coupling the wheel to a vehicle (block 710). In some examples, the example third wheel 204A of FIGS. 3-5 is rotatably coupled to the example vehicle 100 (e.g., via a wheel hub or bearing). After rotatably coupling the third wheel 204A to the vehicle 100, the example method 700 ends.

Although the example vehicle 100 of FIG. 1, one or more of the example wheel assemblies 102, 108, 110, 112 of FIG. 1, the fifth example wheel assembly 200 of FIG. 2, the example third wheel 204A of FIGS. 3-5, the example first annular body 402 of FIGS. 4 and 5, the second example annular body 600 of FIG. 6A, the third example annular body 602 of FIG. 6B, and/or the fourth example annular body 604 of FIG. 6C is/are described with reference to the flowchart illustrated in FIG. 7, any other method of implementing the example vehicle 100 of FIG. 1, one or more of the example wheel assemblies 102, 108, 110, 112 of FIG. 1, the example fifth wheel assembly 200 of FIG. 2, the second example third wheel 204A of FIGS. 3-5, the first example annular body 402 of FIGS. 4 and 5, the second example annular body 600 of FIG. 6A, the third example annular body 602 of FIG. 6B, and/or the fourth example annular body 604 of FIG. 6C may alternatively be used. For example, the order of execution of the blocks of FIG. 7 may be combined and/or some of the blocks described may be changed, eliminated, or additional blocks may be added. The example method 700 shown in FIG. 7 is only one example method describing the implementation of the example vehicle 100 of FIG. 1, one or more of the example wheel assemblies 102, 108, 110, 112 of FIG. 1, the fifth example wheel assembly 200 of FIG. 2, the third wheel 204A of FIGS. 3-5, the first example annular body 402 of FIGS. 4 and 5, the second example annular body 600 of FIG. 6A, the third example annular body 602 of FIG. 6B, and/or the fourth example annular body 604 of FIG. 6C.

"Including" and "comprising" (and all forms and tenses thereof) are used herein to be open ended terms. Thus, whenever a claim lists anything following any form of "include" or "comprise" (e.g., comprises, includes, comprising, including, etc.), it is to be understood that additional elements, terms, etc. may be present without falling outside the scope of the corresponding claim. As used herein, when the phrase "at least" is used as the transition term in a preamble of a claim, it is open-ended in the same manner as the term "comprising" and "including" are open ended.

From the foregoing, it will be appreciated that wheel apparatus for use with vehicles have been disclosed that improve performance of a vehicle, such as vehicle fuel economy or efficiency, vehicle handling and/or maneuverability, vehicle acceleration, etc., by reducing weight of one or more vehicle wheels. Examples disclosed herein facilitate mounting a vehicle tire on a vehicle wheel by preventing improper tire mounting associated with the above noted known vehicle wheels. Further, disclosed examples reduce and/or eliminate audible noise (e.g., road noise) associated with the above noted known vehicle wheels.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a wheel for a vehicle, the wheel having a groove disposed on an annular wall adjacent a drop well, the groove extending radially away from the drop well; and
   a rigid ring positioned in the groove, the ring to bear stress imparted by a tire coupled to the wheel, the ring defining a first surface to receive a portion of the tire, the ring further defining a curved surface extending from the first surface toward a second surface of the drop well to engage a tire bead of the tire.

2. The apparatus of claim 1, wherein the ring includes a mating surface to be received by a protrusion forming at least part of the groove to couple the ring to the wheel.

3. The apparatus of claim 2, wherein the mating surface defines an outer surface of the ring facing toward the drop well to engage the protrusion.

4. The apparatus of claim 1, wherein the ring is hollow.

5. The apparatus of claim 4, wherein the ring includes an opening extending to an inner portion of the ring to enable a fluid to move into or out of the ring.

6. The apparatus of claim 1, wherein the ring is shaped to engage a contour of a surface formed by the groove.

7. The apparatus of claim 6, wherein the ring includes a cross-sectional shape that is oblong.

8. The apparatus of claim 1, wherein the groove is continuous.

9. An apparatus comprising:
a vehicle having a wheel rotatably coupled thereto, wherein the wheel includes an annular groove facing a drop well of the wheel; and
a rigid ring extending through the annular groove, the ring to bear stress imparted by a tire coupled to the wheel, the ring defining a first surface to receive a portion of the tire, the ring further defining a curved surface extending from the first surface toward a second surface of the drop well to engage a tire bead of the tire.

10. The apparatus of claim 9, wherein the ring includes a channel to contain a pressurized fluid and an aperture extending to the channel.

11. The apparatus of claim 9, wherein the ring includes a plastic material.

12. An apparatus comprising:
a wheel to rotatably couple to a vehicle, the wheel having an annular groove to receive an annular body, wherein the annular groove defines a lip to retain the annular body, the lip having a mating surface oriented in a first direction, the first direction having a first component oriented radially relative to the wheel and a second component oriented axially relative to the wheel; and
the annular body, the annular body defining a first surface to receive a portion of a tire, the annular body further defining a curved surface extending from the first surface toward a second surface of a drop well of the wheel to engage a tire bead of the tire.

13. The apparatus of claim 12, wherein the mating surface is to engage a third surface of the annular body.

14. The apparatus of claim 12, wherein the annular groove defines a surface shaped to engage a contour of the annular body.

15. The apparatus of claim 12, wherein the annular body is to receive the portion of the tire when the annular body is retained in the annular groove.

\* \* \* \* \*